United States Patent [19]

Moya

[11] Patent Number: 5,277,811
[45] Date of Patent: Jan. 11, 1994

[54] PROCESS FOR FORMING POROUS POLYMERIC PRODUCT FROM A NONPOROUS POLYMERIC COMPOSITION AND PRODUCT

[75] Inventor: Wilson Moya, Derry, N.H.

[73] Assignee: Millipore Corporation, Bedford, Mass.

[21] Appl. No.: 868,619

[22] Filed: Apr. 14, 1992

[51] Int. Cl.$^5$ .............................................. B01D 69/00
[52] U.S. Cl. ................. 210/500.3; 210/500.36; 210/500.38; 210/500.4; 210/500.41
[58] Field of Search ........... 210/500.1, 500.23, 500.27, 210/500.38, 500.4, 500.41, 500.34, 500.31, 500.35, 500.37, 500.3, 500.24, 500.36, 500.42; 264/41, 49; 428/212, 215, 320.2, 379, 522

[56] References Cited

U.S. PATENT DOCUMENTS

| | | | |
|---|---|---|---|
| 4,203,847 | 5/1980 | Grandine, II | 210/490 |
| 4,340,479 | 7/1982 | Pall | 264/41 |
| 4,414,168 | 11/1983 | Hankin | 264/49 |
| 4,764,320 | 8/1988 | Chau et al. | 210/500.41 X |
| 4,775,474 | 10/1988 | Dow Chemical | 210/500.34 |
| 4,935,140 | 6/1990 | Konstatin et al. | 210/500.4 |
| 5,006,247 | 4/1991 | Dennison et al. | 210/500.48 |
| 5,009,824 | 4/1991 | Walch et al. | 210/500.41 |
| 5,013,339 | 5/1991 | Mahoney et al. | 210/500.42 |
| 5,137,635 | 8/1992 | Seita et al. | 210/500.28 X |

FOREIGN PATENT DOCUMENTS 92109282-1  7/1993  European Pat. Off. .

*Primary Examiner*—Frank Spear
*Attorney, Agent, or Firm*—Paul J. Cook; Andrew T. Karnakis

[57] ABSTRACT

A product having a porous polymeric structure is formed from a non-porous polymeric sheet by sequential contact of the non-porous sheet with a solvent for the sheet and then a non-solvent for the sheet. The porous product can be porous through all or a portion of its thickness.

25 Claims, 5 Drawing Sheets

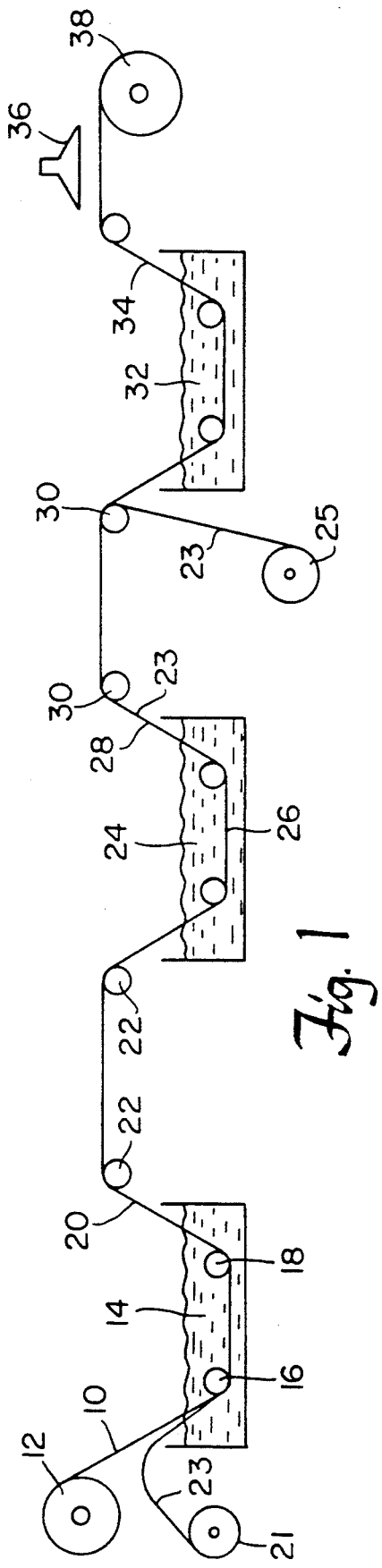
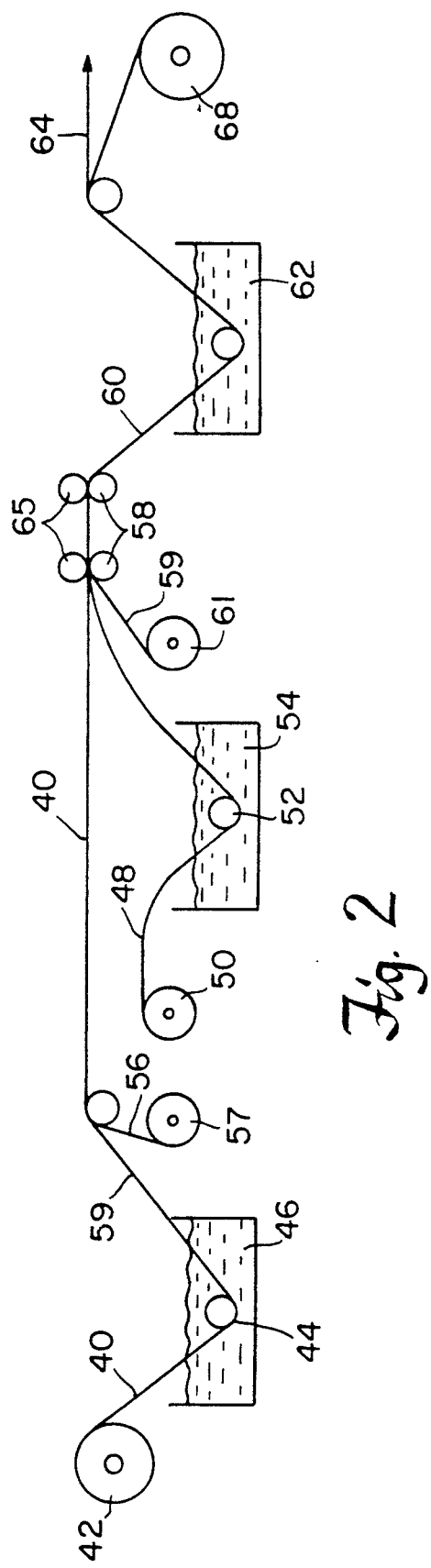

PROCESS FOR FORMING POROUS POLYMERIC PRODUCT FROM A NONPOROUS POLYMERIC COMPOSITION AND PRODUCT

BACKGROUND OF THE INVENTION

This invention relates to a process for making porous polymeric products and to the products so-produced. More particularly, this invention relates to a process for making porous polymeric products from a solid nonporous polymeric structure formed of a homogeneous composition to produce a porous product that can include or be devoid of a solid nonporous layer.

Prior to the present invention, membranes have been produced by thermal or solution phase inversion, stretching, sintering or track etching. By far, the most common process for making microporous membranes is solution phase inversion (wet and/or dry) by which many commercially available membranes are made from polymers such as polyvinylidene fluoride (PVDF), cellulosics, polysulfones or polyamides (Nylons). Phase inversion membranes are made by dissolving a polymer in an appropriate solvent to form a solution. The solution is cast into a thin film, usually 25 um to 250 um thick, on a substrate. The film then is exposed to a suitable non-solvent in the gaseous (dry) or liquid (wet) phase. This latter step induces phase separation, i.e., precipitation of the polymer as a solid mass from the solvent phase. Phase separation conditions can be controlled to effect formation of a porous polymeric structure having a relatively uniform pore size distribution.

It has been proposed in U.S. Pat. No. 2,783,984 to form a polyamide microporous membrane by first forming a solution of polyamide in a mixture of a non-solvent and a solvent for polyamide at the point of incipient polyamide precipitation. An additive such as the non-solvent such as boric acid or citric acid is added to effect the desired precipitation and to form a self-sustaining non-transparent microporous membrane. In the process, as the first step, a homogeneous polyamide solution is formed. The solution is cast on a flat surface such as glass and heated to effect solvent evaporation and to form the microporous membrane. A similar process for forming polyamide microporous membranes is disclosed in U.S. Pat. No. 3,408,315.

U.S. Pat. No. 3,876,738 discloses a process for forming polymeric microporous embranes such as nylon membranes. A dope solution of the polymer is first formed and is directly cast onto a surface which can be positioned below the surface of a non-solvent for the polymer. The dope solution is quenched within the nonsolvent to effect polymer precipitation and membrane formation. Process control parameters are controlled to eliminate the prior art step of gelling in a high humidity atmosphere. The formation of a dope solution is required as the first step in the process.

U.S. Pat. No. 4,340,479 discloses a process for producing a skinless hydrophilic alcohol-insoluble polyamide membrane. In a first step, a solution of the polyamide membrane is formed and free of suspended particles. Nucleation of the solution is effected by the controlled addition to the solution of a non-solvent for the polyamide. The polyamide membrane produced is characterized by reversion from a hydrophilic material to a hydrophobic material which is not wet by water when heated to a temperature just below its softening point.

U.S. Pat. Nos. 4,203,847 and 4,203,848 also disclose processes for forming polymeric microporous membranes. In this process, a solution of the polymer is first formed. The solution then is passed into a bath of non-solvent for the polymer to effect polymer precipitation and membrane formation. The ratio of solvent to non-solvent in the bath is monitored and its composition is adjusted to a desired range.

It has been proposed in U.S. Pat. No. 3,839,516 to contact a crystalline polymeric film with a swelling agent and then stretching the film while the swelling agent is removed to form a porous film. The pores are unidirectional in shape due to the tensile force exerted on the film during stretching. Similarly, it has been proposed in U.S. Pat. No. 3,426,754 to subject a crystalline polymeric film to cold drawing in an amount of 10% to 300% of its original length and then heat setting the film under tension to form a porous film. The pores formed in this film also are unidirectional in shape due to the tensile force exerted on the film during cold drawing and heat setting.

It has also been proposed to treat a film formed from a nonhomogeneous polymeric composition which contains either an extractable composition or a releasable composition such as by solvent extraction or heating so that pores are formed in the polymeric film after the composition has been either extracted and/or released. The polymeric compositions which can be treated in this manner are limited since they require the presence of either the extractable composition or the releasable composition.

The porous membranes produced can be utilized in filtration in general or in specific utilizations such as for binding nucleic acids such as DNA, RNA, proteins, cells, or the like. Polyamide membranes are particularly useful for binding nucleic acids since they provide a large surface area and covalently bind the nucleic acid. In certain applications such as in direct blotting electrophoresis (DBE), a rigid substrate is desired for use as both conveyor and as the immobilizing matrix. Presently available polyamide membranes require that they be laminated to a rigid substrate. When wet, these laminates swell, wrinkle and delaminate.

Many of the processes described in the above-identified patents rely upon the formation of an initial casting solution which is then processed. The casting solutions are formed by admixing polymeric particles until the particles completely dissolved. Since the particles vary in size, the time required to solvate the individual particles will vary from batch to batch. The composition of these solutions must be controlled carefully in order to attain the desired polymer precipitation and membrane formation in the subsequent step of contacting the solution with a non-solvent for the polymer. This procedure requires that the process be conducted as a batch process wherein the process is initiated by forming the polymer solution. In addition, it is difficult to precisely control the product consistency from batch to batch since it is difficult to exactly reproduce the solution composition from batch to batch.

Therefore, it would be desirable to provide a process for forming polymeric porous products which is a continuous process rather than a batch process in order to improve efficiency. In addition, it would be desirable to provide such a process wherein the time that the solvent interacts with the solid polymer can be controlled precisely. This control would permit the formation of porous products having a more uniform surface porosity.

In addition, it would be desirable to provide such a process wherein the average pore size can be controlled precisely and wherein the distance that the pores extend from the product surface into the product thickness can be controlled precisely. In addition, it would be desirable to provide a process which does not rely on the presence of extractable and or releasable compositions to form a porous structure. Furthermore it would be desirable to provide such a process which does not require the use of tensile forces such as in a stretching step to form a porous structure.

SUMMARY OF THE INVENTION

The present invention provides a process for making polymeric porous products such as microporous or ultrafiltration membranes or membrane-like products which can include a solid non-porous layer from a non-porous, solid polymeric structure such as a film, fiber, tube or the like. For convenience, this invention will be described specifically herein with reference to a solid non-porous film or sheet. However, it is to be understood that this invention is applicable for use with any solid non-porous polymeric composition regardless of its shape such as a film, fiber, sheet, slab, tube, cylinder, rod or the like. The process of this invention permits the use of a continuous reel to reel process wherein the degree of polymer-solvent interaction can be controlled precisely by controlling the time the solvent is in contact with the non-porous structure such as a sheet or film. This permits precise control of product porosity in terms of uniformity of surface porosity and of the average pore size within different layers of the product. In this process, the polymer sheet is immersed in a solvent for the polymer sheet so that one or both surfaces of the sheet is contacted directly with the solvent. The solvent softens the sheet by gelling the sheet. The gelled polymer sheet is removed from the solvent and directed to a step where the solvent is removed to effect polymer precipitation and pore formation. The solvent can be removed with a nonsolvent for the polymeric sheet which is miscible with the solvent, by evaporation of the solvent either in a dry atmosphere or a humid atmosphere or a combination of evaporation and nonsolvent contact. An alternative means for effecting polymer precipitation is to vary the temperature of the gelled polymeric composition thereby forming a porous structure and subsequently removing the solvent from the precipitated porous structure. The time that the solvent gels the polymer sheet can be controlled easily since the time between which the sheet leaves the solvent bath and the time it begins to precipitate can be controlled precisely by controlling the distance and/or travel velocity of the sheet between the two steps. The polymer sheet can be supported or unsupported during travel between the two steps.

For convenience, this invention will be described specifically herein with reference to the use of a nonsolvent bath to effect polymer precipitation. However it is to be understood that this invention can be conducted with any means for effecting polymer precipitation from a gelled polymeric composition such as by solvent evaporation or the like. When the gelled polymer sheet is immersed in the non-solvent, the gelled portion of the sheet precipitates to form a porous structure. The degree of gelation can be controlled so that all or only a portion of the thickness of the polymer sheet is gelled. When only a portion of the sheet thickness is gelled, a portion of the sheet thickness remains non-porous and provides additional mechanical strength to the final partially porous product.

As used herein, the term "solvent" means a composition which effects some gelation of a polymeric composition. It is to recognized that some solvents have a strong gelation effect on some polymeric compositions and a relatively weak effect on other polymeric compositions. All that is necessary for purposes of this invention is that the solvent exerts some gelation effect. Similarly, the term "non-solvent" as used herein means a composition that effects precipitation of a gelled polymeric composition thereby to effect pore formation within the precipitated gelled polymeric composition. In addition, a non-solvent useful herein does not gel a support substrate when such a substrate is utilized. Gel formation or gelation as used herein means a condition of a polymeric composition after contact with the solvent wherein a portion of the solvent is imbibed by the polymeric composition to cause the polymeric composition to become at least partially softened as compared to the solid form of the polymeric composition prior to contact with the solvent. As used herein the phrase "homogeneous polymeric composition" refers to a polymeric composition which is free of extractable compositions and/or releasable compositions which, when removed from the polymeric composition would effect formation of a porous structure in the polymeric composition. It is to be understood that in the process of this invention a small portion of the polymeric composition such as low molecular weight components may be extracted with the solvent. However, this extraction mechanism is insufficient to effect pore formation in the polymeric composition. In contrast, pore formation in the homogeneous polymeric compositions utilized in the present invention is effected by phase inversion wherein the gelled portion of the polymeric composition is converted to a porous solid composition. By the term "nondirectional" as used herein to describe a porous structure is meant a porous morphology which is random in any direction. Such a structure is in contrast to a unidirectional structure where the pores are aligned in a given direction such as is obtained with processes utilizing a stretching step where the pores are aligned in the direction of the tensile force encountered during the stretching step. In the process of this invention a solid nonporous polymeric structure is converted directly to a porous polymeric product in the absence of a step where the solid is converted to a liquid solution such as is utilized in a typical casting process. Since such a liquid solution is not required in the process of this invention, the porous product of this invention can be formed continuously from the nonporous solid polymeric starting material.

BRIEF DESCRIPTION OF THE DRAWINGS

FIG. 1 illustrates the process of this invention.

FIG. 2 illustrates an alternative process of this invention wherein a laminate is formed.

DESCRIPTION OF SPECIFIC EMBODIMENTS

Figure 4:
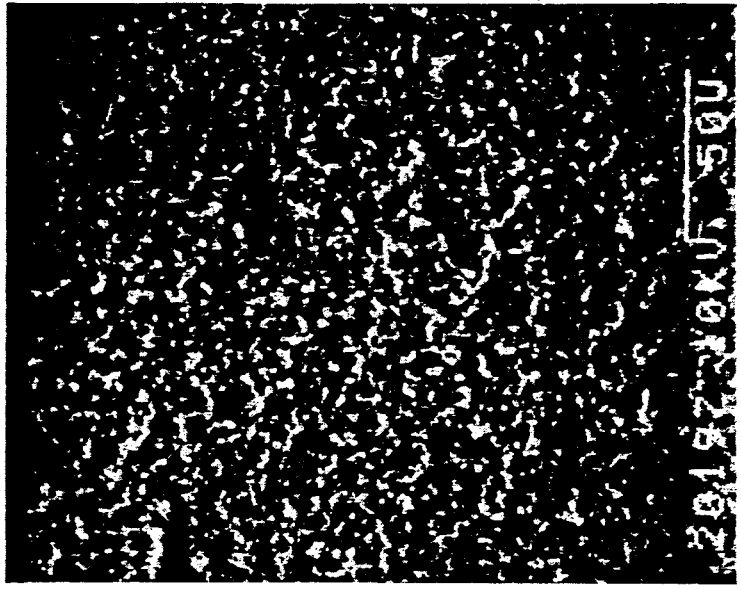
FIG. 4 is a photomicrograph at 500 times magnification of a second surface of the product of FIG. 3.

In accordance with this invention, porous polymeric products are formed from a nonporous polymeric sheet formed of a homogeneous polymeric composition. The nonporous sheet first is contacted with a solvent composition which is a solvent for the sheet so that one or both surfaces of the sheet come in direct contact with the solvent. The sheet then is removed from the solvent composition prior to dissolving the sheet so that the contacted sheet remains sufficiently mechanically strong to be transported, supported or unsupported in the form of a solid or semisolid. The solvent is entrained with the sheet when it is removed from the source of the solvent such as a solvent bath, a solvent spray, a transfer roller or the like. The entrained solvent continues to gel the sheet surface or surfaces such that the sheet is converted from a solid to a gel beginning at the sheet surface and progressing to the interior of the sheet thickness. During the time period of gelation, the mechanical strength of the sheet can be reduced to a condition wherein the sheet requires support, such as with a support belt which is not attacked by the solvent, in order to effect sheet transport to succeeding process steps.

In a second step, the gelled sheet is contacted with a nonsolvent for the polymeric sheet. The nonsolvent is miscible with the solvent. This contact effects precipitation of the gelled polymeric composition and the formation of pores within the precipitated polymer. The portion of the polymeric sheet which was not gelled remains as a nonporous solid throughout the process and after completion of the process.

In a third step the porous polymeric sheet is contacted with a rinse bath to remove substantially all of the solvent and non-solvent. The rinse bath is miscible with both the solvent and the non-solvent and does not attack the porous polymeric sheet. The rinsed porous polymeric sheet then is dried by any conventional means such as by heating.

The products formed in accordance with the present invention are derived from a non-porous polymeric film and can comprise a porous membrane wherein the pores extend through the entire thickness of the product. Alternatively, the product of this invention can comprise a composite product having a layer which is a nonporous polymeric solid and one or both outside surface layers comprising a porous polymeric structure. The completely porous membrane product of this invention is characterized by having tortuous, random, non directional pathways throughout the product thickness. The pathways can be open wherein they are in communication with each other or closed. As used herein the term "closed pathways" means closed cells which are not in communication with each other. The completely porous membrane products of this invention differ from track-etched porous products having straight non-random pathways. The completely porous membrane products of this invention are derived from a solid non-porous polymeric sheet also are characterized by having a greater matrix tensile strength as compared to completely porous membrane products of the prior art form prepared from a solution of the polymeric composition. Generally, the completely porous membrane products of this invention formed from a given polymeric composition have a matrix tensile strength at least about 30% greater than, and more usually more than 70% greater than a completely porous membrane product formed from a solution of the same polymeric composition by conventional casting procedures. The term "matrix tensile strength" as used herein means the tensile strength of the porous product divided by the volume percent of the solid in the porous product.

The completely porous products of this invention can be utilized as a filtration membrane while the composite structure having a nonporous layer can be utilized in blotting processes such as nucleic acid or protein blotting, in diagnostic applications where the porous regions can contain diagnostic reagents or in chromatographic separation processes such as thin layer chromatography.

The products of this invention can be made from polymeric sheets or film having a wide variety of thickness thus making the final product as strong or rigid as desired. For certain applications, such as in direct blotting electrophoresis, a rigid substrate is desired to be used as both conveyor and as the immobilizing matrix, particularly with polyamide porous surfaces. The process of this invention provides products having these desired mechanical properties while avoiding the need for laminating the membrane to a rigid support. The nonlaminated products of this invention exhibit negligible swelling and remain flat when wet while laminated membranes such as polyamide membranes swell when wet causing wrinkling and delamination. However, it is to be understood that laminated products can be made in accordance with this invention, when desired, wherein the porous products of this invention or the porous products of this invention containing a non-porous layer can be laminated to a substrate.

In an alternative embodiment of this invention, a laminate product is formed including a porous of nonporous substrate sheet having adhered thereto one or two polymeric sheets, each of which have an exposed surface. The substrate sheet can provide additional mechanical strength in applications where it is desired. In addition, when two or more polymeric sheets are utilized, they can be formed from the same or different polymeric compositions. This embodiment is useful when it is desired to form porous products having one surface with a porosity independent of the porosity of the second surface or when it is desired to have one surface with chemical properties independent of the chemical properties of the second surface. When two or more sheets having different polymeric compositions are used, a laminate structure can be formed having a plurality of different surface characteristics such as varying degrees of hydrophilic properties or hydrophobic properties or varying degrees of reactivity. The polymeric sheets need not overlap each other 100% but can be overlaid to expose a portion of each sheet on one or both surfaces of the laminated product as shown, for example in FIG. 10. This embodiment wherein the sheets are overlapped also can be utilized with sheets having the same polymeric composition but which are treated under varying conditions of solvent contact such as residence time, solvent composition or temperature of solvent bath thereby to vary the porosity and/or structure morphology between porous sheets of the final product. It is to be understood that the laminate can be formed from a plurality of polymeric sheets which are rendered porous without the need for an intermediate substrate layer. These laminates can be formed directly without the need for an intermediate adhesive layer.

For convenience this invention will be described first with reference to a nonlaminated product and then with reference to a laminated product. In the first step of this invention, the polymeric sheet is contacted with a solvent for the polymeric composition of the sheet in any convenient manner such as by passing the sheet through a solvent bath, spraying the solvent onto the sheet or applying the solvent by contact with a substrate containing the solvent. When it is desired to contact only one surface of the sheet with solvent, the second surface is protected with a protecting mask which is temporarily or permanently laminated or adhered to the second surface. The protecting mask is not soluble in the solvent. In any event, the degree of interaction of the polymeric sheet with the solvent including the amount, type of solvent, solvent and/or sheet temperature and the time of contact of the sheet with the solvent is such as to effect the desired degree of swelling of the polymeric sheet and gelation of the sheet so that the solvent penetrates into the desired thickness of the sheet to form a gelled polymeric composition which is sufficiently mechanically strong, either supported or unsupported to retain its original sheet configuration yet, when subsequently contacted with a nonsolvent for the polymer, it precipitates to form a porous structure through all or a portion of its thickness beginning with the sheet surface.

The polymeric sheet contacted with the solvent then is contacted with a non-solvent for the polymeric sheet. The sheet and solvent are transported to contact with the non-solvent by any convenient means such as over a series of rollers or belts. The contacted sheet can be either supported or unsupported. The time between contact of the sheet with the solvent and then with the nonsolvent is controlled to effect the desired degree of gelling which corresponds to the subsequent porosity of the formed product. Contact with the nonsolvent is controlled so that the gelled sheet is converted to a porous product by precipitation. In a final step, the porous product is washed and dried to remove solvent and nonsolvent.

In a preferred embodiment of this invention, the process is conducted as a reel-to-reel process. The nonporous film is stored on a feed roller and passed continuously into contact with the solvent, nonsolvent, washed and dried on a series of rollers and/or belts wherein the time of contact with solvent and nonsolvent is controlled to effect the desired degree of gelation and subsequent porosity formed wherein the pores are of a relatively uniform size. The process of this invention can be utilized to form microporous or ultrafiltration products which can include or be devoid of a non-porous layer.

Representative suitable homogeneous polymeric compositions which can be utilized in the invention include polyamides, polycarbonates, polyvinylchloride, polyvinylidene difluoride, poly-olefins such as polyethylene or polypropylene, cellulose esters such as cellulose acetate or cellulose nitrate, polystyrene, polyimides, polyetherimides, polysulfones, polyethersulfones, acrylic polymers, methacrylic polymers, copolymers there of, blends thereof or the like. The polymeric composition can be crystalline, non-crystalline or partially crystalline. The only requirement for the polymer is that there be an available solvent for the polymer and a nonsolvent, when used, is miscible with the solvent for the polymer so that the polymer can be sequentially gelled and precipitated. The porous portion of the product of this invention can have pores which are micropores having a size typically between about 0.05 and 10 microns or ultrafiltration pores having a size typically between about 40 Angstroms and 0.05 microns. The surface morphology of the products of this invention can be non-skinned having an open, lacy or nodular structure or can be skinned.

When it is desired to produce a laminated product in a reel to reel process, a first polymeric sheet is passed sequentially through a solvent for the polymeric composition of the first polymeric sheet, in contact with a first surface of a substrate sheet, a first fusion step to adhere the first polymeric sheet to the substrate sheet and then through a non solvent for the first polymeric sheet and the substrate sheet. A second polymeric sheet, when utilized, is passed sequentially through a solvent for the polymeric composition of the second polymeric sheet, a second fusion step to adhere the second polymeric sheet to the substrate sheet and then through a nonsolvent for the second polymeric sheet and the substrate sheet. In a preferred embodiment, the first fusion step and the second fusion step are the same step. Also, in a preferred embodiment, the non solvent bath is the same bath for the first polymeric sheet and the second polymeric sheet. It is to be understood that the use of the substrate sheet is optional and when not in use, the first and second polymeric sheets may be directly fused to each other as described above to form a laminate product.

The process will be described herein further with particular reference to processing a polyamide film or sheet. However, it is to be understood that this description is exemplary and applicable to processing other polymeric compositions with the use of appropriate solvents and nonsolvents and appropriate process conditions to effect sequential gelation and precipitation. When utilizing a polyamide film of about 3 mils thick to prepare a porous membrane having pores throughout its thickness, the sheet is contacted with formic acid. Gelation of a polyamide film having a thickness of 3 mils with formic acid is effected generally for a period of time between about 5 and 30 seconds in order to effect gelation throughout the film thickness. Lesser time periods of gelation are utilized when it is desired to produce a porous structure formation less than the total thickness of the original polymeric sheet. In addition, greater or lesser times are utilized depending upon the thickness of the starting sheet and/or temperature of the solvent and/or sheet. The gelled sheet then is contacted with a non-solvent for the polymeric composition for a short time sufficient to effect precipatation of the gelled polymeric composition as a porous product. Typically, the non solvent can be humid air, water, water/formic acid, alcohol or water/alcohol mixtures at a temperature between about 0° C. and 50° C. Contact with the nonsolvent typically is between about 1 and 10 minutes in order to effect precipitation of the polymeric composition to produce the porous product. The product then is rinsed in water, alcohol or the like of between about 0° C. and 50° C. to remove the solvent and nonsolvent.

Referring to FIG. 1, a reel-to-reel process for conducting this invention is illustrated. The nonporous polymeric sheet 10 is stored on motorized roller 12. A carrier belt 23 is stored on motorized roller 21. The sheet 10 along with the carrier belt 23 is passed into solvent bath 14 under rollers 16 and 18. The gelled sheet 20 and belt 23 are passed over rollers 22. The sheet 26 in bath 24 is precipitated to form a porous product 28. The porous product 28 and belt 23 are passed over rollers 30 and the porous product 28 is directed into rinse bath 32. The belt 23 is taken up on roller 25. The rinsed porous product 34 is dried such as with a heating lamp 36 and stored on take-up roll 38. In the case of a polyamide nonporous sheet, the solvent bath 14 can comprise formic acid, trifluoroethanol, phenol, mixtures thereof, mixtures with nonsolvents or the like. The nonsolvent bath 24 and rinse bath 32 can comprise water, water/formic acid, alcohol, mixtures thereof or the like. The nonsolvent bath 24 and rinse bath 32 can be replenished periodically or continuously to remove the accumulated solvent therein and replacing it with the nonsolvent or rinse solution. When only one surface of the non-porous sheet is contacted with a solvent, one surface of the porous product contains pores and the second surface can contain or be free of pores. Contact of only one surface of the non-porous sheet with solvent can be effected by utilizing a protecting contact mask on one surface of the non-porous sheet. Alternatively this can also be accomplished by spraying the solvent onto one surface of the non-porous sheet or by utilizing a contact surface such as a roller to deposit solvent on one surface of the non-porous sheet. When forming a product which is not completely porous, a portion of the product thickness remains as a nonporous solid and the product structure/s is/located on the porous product surface or surfaces initially contacted with solvent.

Referring to FIG. 2, a process is depicted for forming a laminate product of this invention. A first polymeric sheet 40 such as a polyamide 66 is passed from reel 42 under roller 44 and through a solvent bath 46 such as 98% formic acid to gel the polymeric sheet 40. A substate 56 passes from roller 57 to contact and support the sheet 59. A second polymeric sheet such as a polyamide 6 (48) is passed from reel 50 under roller 52 through solvent bath 54 such as 88% formic acid to gel the polymeric sheet 48. The gelled sheets 40 and 48 are contacted with a substrate sheet 56. A carrier belt 59 passes from feed roller 61 and is taken up by roller 63. The carrier 59 supports the gelled sheets 40 and 48 and the substrate sheet 56. These sheets pass between rollers 58 and 65 to form a singular laminated sheet 60 supported on carrier belt 59. Alternatively, gelled sheets 40 and 48 can be contacted directly to each other. The laminated sheet 60 is passed through non-solvent bath 62 such as water which is a nonsolvent for both polymeric sheets 40 and 42 as well as substrate sheet 56. Contact with the nonsolvent 62 effects precipitation of the gelled portions of laminated sheets 40 and 48 thereby to form porous layers from both sheets 40 and 48 in the laminated final product 64. The laminated sheet 60 then is rinsed and dried as described above.

Figure 9:
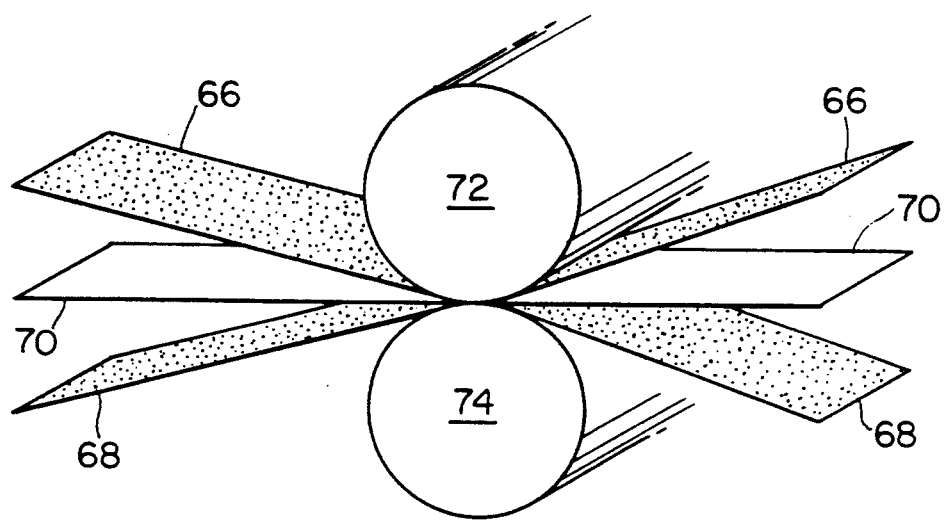
FIG. 9 illustrates an alternative means for applying solvent to a solid non-porous polymeric sheet in accordance with this invention.

Referring to FIG. 9, two porous carrier sheets 66 and 68 which are impregnated with a solvent for sheet 70 but not for sheets 66 and 68 are passed between roller 72 and 74 to contact sheet 70 thereby to transfer solvent to sheet 70. Sheet 70, containing solvent then is passed through a non-solvent bath and treated as described above.

Figure 10:
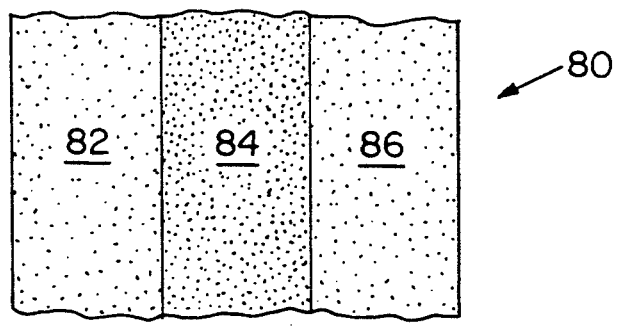
FIG. 10 is a top view of an offset multilayer porous product of this invention.

Referring to FIG. 10, a multilayer porous product 80 is formed by contacting a plurality of non-porous polymeric sheets sequentially with a solvent and then a non-solvent as described above. After each sheet is sequentially contacted with a solvent they are contacted together in an overlapping configuration such as on a belt. The multi-layer gelled sheet configuration then is passed through a nonsolvent for each of the gelled sheets to effect pore formation. The porous multi-layer product 80 can be formed of three porous sheets 82, 84 and 86 for example, or from two porous sheets or more than three porous sheets.

The following examples illustrate the present invention and are not intended to limit the same,

EXAMPLE I

This example illustrates the formation of a porous product having two porous surfaces and a layer within the interior of its thickness which is non-porous.

Figure 3:
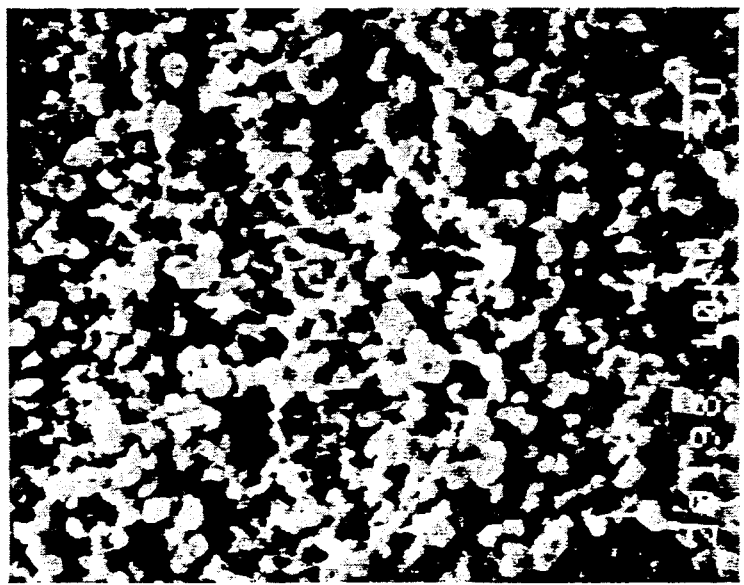
FIG. 3 is a photomicrograph at 2000 times magnification of one surface of a porous polyamide product of this invention which includes a non-porous layer.
Figure 5:
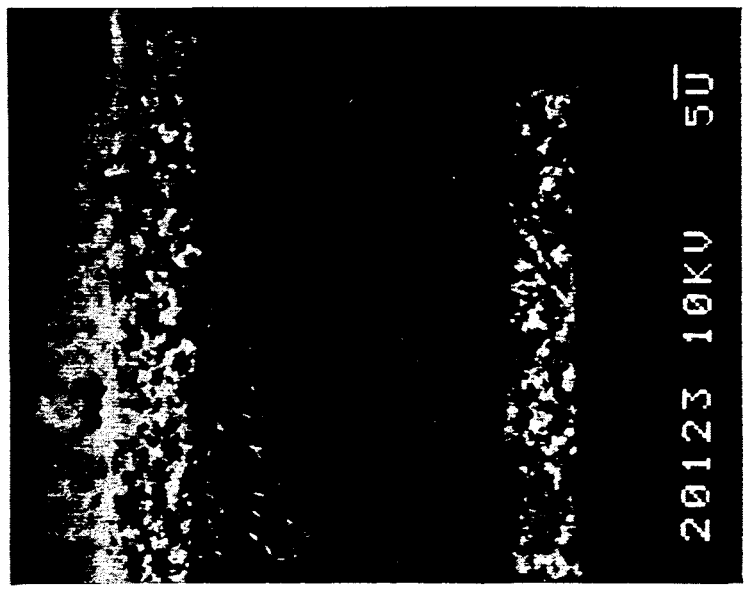
FIG. 5 is a photomicrograph at 1000 times magnification of the cross section of the product of FIGS. 3 and 4.

A 4 mil thick sheet of Nylon 66 polyamide was immersed in a formic acid solvent at 25° C. for 20 seconds. The film swelled and had the following characteristics: Soft and tacky but strong enough to support itself without extensive deformation. The gelled film then was immersed in isopropanol-water nonsolvent at 25° C. for 2 minutes whereupon the gelled portion of the film precipitated to form a porous surface. The porous product then was rinsed in water and dried at 30° C. Opposing exposed surfaces of the porous structure are shown in FIGS. 3 and 4. The cross section of the porous structure is shown in FIG. 5. As shown in FIG. 5, the surface of FIG. 3, 40 and the surface of FIG. 4,42 contain pores having the largest pore size in the overall structure. The interior of the structure 44 has the smallest pores. The layer 45 is non-porous. This structure is hydrophilic throughout its porous structure and is particularly useful as a substrate for immobilizing biomolecules such as nucleic acids, or as a substrate for chromatographic separations such as in thin layer chromatography.

EXAMPLE II

This example illustrates the formation of a porous product useful as a membrane having two porous surfaces and which is porous throughout its thickness.

Figure 6:
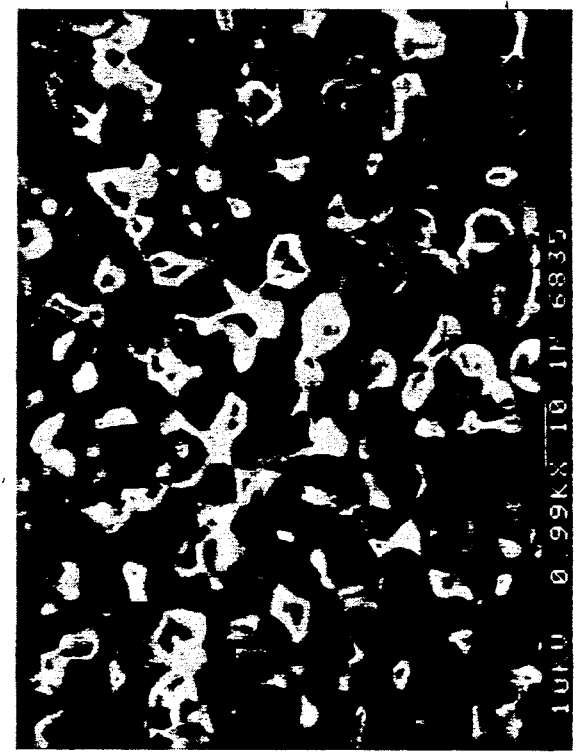
FIG. 6 is a photomicrograph at 990 times magnification of one surface of a polyamide membrane which is microporous throughout its thickness.
Figure 7:
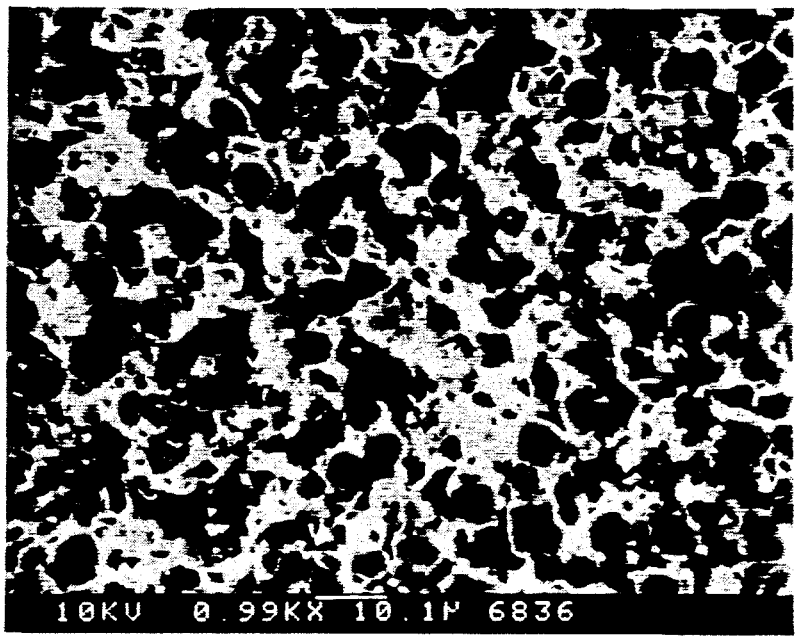
FIG. 7 is a photomicrograph at 990 times magnification of the opposing surface of the membrane surface of FIG. 6.
Figure 8:
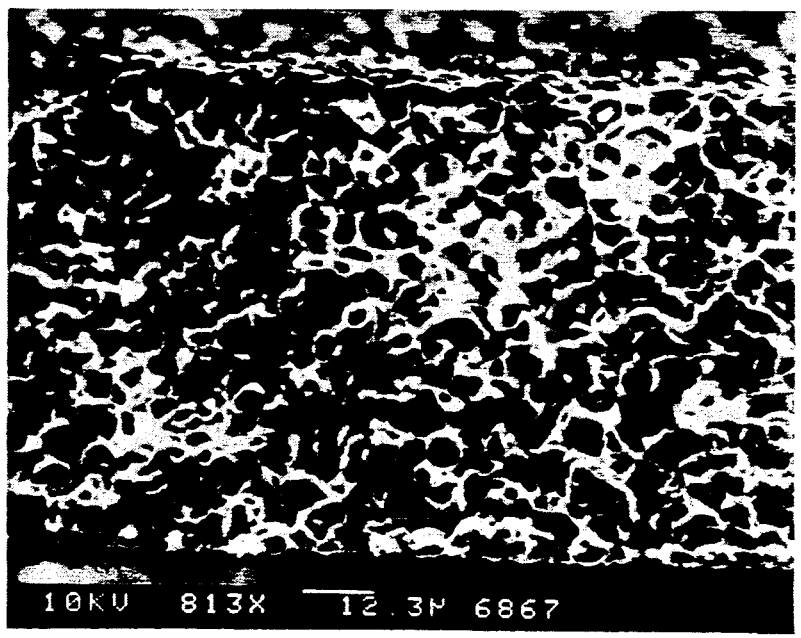
FIG. 8 is a photomicrograph at 813 times magnification of the cross section of the membrane of FIG. 6.

A 3 mil thick sheet of Nylon 6/66 polyamide copolymer was immersed in a formic acid solvent at 25° C. for 5 to 10 seconds. The sheet then was removed from the solvent, placed on a glass support and allowed to gel for 5 minutes at 25° C. The film swelled and subsequently formed a gel of a tacky consistency. The gelled film then was immersed in isopropanol-water nonsolvent at 25° C. for 5 minutes whereupon the gelled portion of the film precipitated to form a porous structure. The porous product then was rinsed in water and dried at 30° C. Opposing exposed surfaces of the microporus structure are shown in FIGS. 6 and 7. The cross section of the microporous structure is shown in FIG. 8. This product has a hydrophilic surface structure throughout its thickness and is particularly useful as filtration media.

EXAMPLE III

This example illustrates the formation of a laminated or single sheet porous product useful as a membrane having two porous surfaces and which is porous throughout its thickness.

A 2 mil thick sheet of polyetherimide was immersed in N-methyl pyrrolidone at 90°-100° C. for 3-5 seconds. The sheet was then removed from the solvent and placed on a non-woven support fabric formed from polyamide fibers, which was in turn placed on a glass support. Thirty to sixty seconds were allowed for the solvent to gel the sheet at 90°-100° C. The sheet swelled and formed a gel with a tacky consistency and which became intimately attached to the non-woven fabric. The non-woven fabric containing the gelled sheet was then immersed in a solution containing 20% methanol/80% N-methyl pyrrolidone for 1-2 minutes at 25° C. At this point, no visible precipitate was observed. The non-woven fabric containing the gelled sheet was then immersed in a non-solvent bath consisting of 50% methanol/50% N-methyl pyrrolidone for 2-5 minutes at 25° C. wherein the gelled sheet precipitated to form a reinforced, laminate composite porous membrane i.e., a porous polyetherimide membrane which has a non-woven fabric permanently embedded in a portion of its cross section and which serves as a support to increase the strength and/or rigidity of the final product. The porous product was then rinsed in methanol and then in water and dried at 30° C. The same procedure can be effected in the absence of the substrate non-woven fabric to produce a single layer, non-laminated porous sheet.

EXAMPLE IV

This example illustrates the formation of a laminated or single sheet porous product useful as a membrane having two porous surfaces and which is porous throughout its thickness.

A 2 mil thick sheet of polystyrene was immersed in n-butyl acetate at 25° C. for 3-5 seconds. The sheet was then removed from the solvent and placed on a non-woven support fabric formed from polypropylene fibers, which was in turn placed on a glass support. One to five minutes were allowed for the solvent to gel the sheet at 25° C. The sheet swelled and formed a gel with a tacky consistency and which became intimately attached to the non-woven fabric. The non-woven fabric containing the gelled sheet was then immersed in a solution containing 20% methanol/80% n-butyl acetate for 1-2 minutes at 25° C. At this point, no visible precipitate was observed. The non-woven fabric containing the gelled sheet was then immersed in a non-solvent bath consisting of 50% methanol/50% n-butyl acetate for 2-5 minutes at 25° C. wherein the gelled sheet precipitated to form a reinforced, laminate composite porous membrane i.e., a porous polystyrene membrane which has a non-woven fabric permanently embedded in a portion of its cross section and which serves as a support to increase the strength and/or rigidity of the final product. The porous product was then rinsed in methanol and then in water and dried at 30° C. The same procedure can be effected in the absence of the substrate non-woven fabric to produce a single layer, non-laminated porous sheet.

EXAMPLE V

This example illustrates the formation of a laminated or single sheet porous product useful as a membrane having two porous surfaces and which is porous throughout its thickness.

A 2 mil thick sheet of polysulfone was immersed in N-methyl pyrrolidone at 90°-100° C. for 3-5 seconds. The sheet was then removed from the solvent and placed on a non-woven support fabric formed from polyamide fibers, which was in turn placed on a glass support. Thirty to sixty seconds were allowed for the solvent to gel the sheet at 90°-100° C. The sheet swelled and formed a gel with a tacky consistency and which became intimately attached to the non-woven fabric. The non-woven fabric containing the gelled sheet was then immersed in a solution containing 30% methanol/70% N-methyl pyrrolidone for 1-2 minutes at 25° C. At this point, no visible precipitate was observed. The non-woven fabric containing the gelled sheet was then immersed in a non-solvent bath consisting of 100% methanol for 2-5 minutes at 25° C. wherein the gelled sheet precipitated to form a reinforced, laminate composite porous membrane i.e., a porous polysulfone membrane which has a non-woven fabric permanently embedded in a portion of its cross section and which serves as a support to increase the strength and/or rigidity of the final product. The porous product was then rinsed in methanol and then in water and dried at 30° C. The same procedure can be effected in the absence of the substrate non-woven fabric to produce a single layer, non-laminated porous sheet.

EXAMPLE VI

This example illustrates the formation of a porous product useful as a membrane having two porous surfaces and which is porous throughout its thickness.

A 3 mil thick sheet of polyvinylidine difluoride polymer was immersed in N-methyl pyrrolidone solvent at 80°-90° C. for 5 to 10 seconds. The sheet then was removed from the solvent, placed on a glass support and allowed to gel for 5 minutes at 25° C. The film swelled and subsequently formed a gel of a tacky consistency. The gelled film then was immersed in methanol nonsolvent at 25° C. for 5 minutes whereupon the gelled portion of the film precipitated to form a porous structure. The porous then product then was rinsed in methanol and water and dried at 30° C.

EXAMPLE VII

This example illustrates a process utilizing a step of solvent evaporation in combination with humid air to precipitate the gelled polymeric composition.

The process of example 2 was repeated except that the gelled film was placed on a glass plate substrate and exposed to humid air at room temperature. The product obtained was porous throughout its thickness. Residual solvent was removed by rinsing the porous film in water.

I claim:

1. A porous polymeric product having non-directional tortuous pathways derived directly from a solid non-porous polymeric structure having a homogeneous polymeric composition, said pathways formed by precipitation of said polymeric composition.

2. The porous polymeric product of claim 1 formed of a first polymeric composition having a matrix tensile strength of at least about 30% greater than the matrix tensile strength of a porous polymeric product formed from a solution of said first polymeric composition.

3. The porous polymeric product of claim 1 formed of a first polymeric composition having a matrix tensile strength of at least about 70% greater than the matrix tensile strength of a porous polymeric structure formed from a solution of said first polymeric composition.

4. The porous polymeric product of any one of claims 1, 2 or 3 wherein said product is in the form of a sheet.

5. The porous polymeric product of any one of claims 1, 2 or 3 wherein said product is in the form of a solid fiber.

6. The porous polymeric product of any one of claims 1, 2 or 3 wherein said product is in the form of a hollow fiber.

7. The product of claim 1 comprising a microporous membrane having pores throughout its thickness.

8. The product of claim 2 comprising a microporous membrane having pores throughout its thickness.

9. The product of claim 3 comprising a microporous membrane having pores throughout its thickness.

10. The product of claim 1 comprising an ultrafiltration membrane having pores throughout its thickness.

11. The product of claim 2 comprising an ultrafiltration membrane having pores throughout its thickness.

12. The product of claim 3 comprising an ultrafiltration membrane having pores throughout its thickness.

13. The product of any one of claims 1, 2, 3, 4, 5 or 6 wherein said structure is formed of a polyamide composition.

14. The membrane structure of any one of claims 1, 2, 3, 4, 5 or 6 wherein said structure is formed of a nitrocellulose composition.

15. The membrane structure of any one of claims 1, 2, 3, 4, 5 or 6, wherein said structure is formed of polycarbonate composition.

16. The membrane structure of any one of claims 1, 2, 3, 4, 5 or 6 wherein said structure is formed of a poly (vinyl chloride) composition.

17. The membrane structure of any one of claims 1, 2, 3, 4, 5 or 6 wherein said structure is formed of a polyvinylidene fluoride composition.

18. The membrane structure of any one of claims 1, 2, 3, 4, 5 or 6 wherein said structure is formed of a polysulfone composition.

19. The membrane structure of any one of claims 1, 2, 3, 4, 5 or 6 wherein said structure is formed of a cellulose acetate composition.

20. The membrane structure of any one of claims 1, 2, 3, 4, 5 or 6 wherein said structure is formed of a polystyrene composition.

21. The membrane structure of any one of claims 1, 2, 3, 4, 5 or 6 wherein said structure is formed of a polyethersulfone composition.

22. The porous polymeric product of any one of claims 1, 2, or 3 wherein such product is in the form of a slab.

23. The membrane structure of any one of claims 1, 2, 3, 4, 5 or 6 wherein said structure is formed of a polyolefin composition.

24. The membrane structure of any one of claims 1, 2, 3, 4, 5 or 6 wherein said structure is formed of polyacrylic composition.

25. The membrane structure of any one of claims 1, 2, 3, 4, 5 or 6 wherein said structure is formed of a polymethacrylic composition.

* * * * *